United States Patent [19]
Leveque

[11] Patent Number: 5,907,584
[45] Date of Patent: May 25, 1999

[54] SYSTEM AND METHOD FOR TRANSMITTING AND RECEIVING A LINCOMPEX SIGNAL HAVING INFORMATION ENCODED THEREON THROUGH ANGLE MODULATION

[75] Inventor: J. Howard Leveque, Columbia, Md.

[73] Assignee: Link Plus Corporation, Ellicott City, Md.

[21] Appl. No.: 08/557,575

[22] Filed: Nov. 14, 1995

[51] Int. Cl.⁶ .................................................. H04K 27/30
[52] U.S. Cl. .......................... 375/296; 370/202; 375/377; 375/271; 455/43
[58] Field of Search .................................... 375/259, 271, 375/377, 295, 296; 455/43, 72; 370/202

[56] References Cited

U.S. PATENT DOCUMENTS

| | | | |
|---|---|---|---|
| 4,123,711 | 10/1978 | Chow | 325/62 |
| 4,271,499 | 6/1981 | Leveque | 370/7 |
| 4,907,217 | 3/1990 | Leveque | 370/7 |
| 5,058,202 | 10/1991 | Leveque | 455/43 |
| 5,065,451 | 11/1991 | Leveque | 455/72 |
| 5,095,539 | 3/1992 | Leveque | 455/72 |
| 5,454,010 | 9/1995 | Leveque | 375/202 |
| 5,495,468 | 2/1996 | Leveque | 370/7 |

Primary Examiner—Chi H. Pham
Assistant Examiner—Bryan Webster
Attorney, Agent, or Firm—Shlesinger, Arkwright & Garvey LLP

[57] ABSTRACT

The system and method of the present invention include a modulator which encodes data on a communication signal using angle modulation. The demodulator, receiving the angle modulated communication signal, angle demodulates the angle modulated communication signal to obtain the data. In this manner, separate frequency bands are not required to transmit both the communication signal and the data. The bandwidth of the transmission from the modulator is reduced to the frequency band of the angle modulated communication signal. Additionally, since angle modulations of an audio signal are inaudible to a listener, when the communication signal is an audio signal, the angle modulated audio signal may be directly output to a listener at the demodulator. A multitude of applications exist for the present invention including Lincompex communication. In Lincompex communication, a Lincompex compressor compresses the communication signal based on the envelope thereof, and outputs a control tone representative of the envelope. The system and method of the present invention treats the control tone as the data, and encodes the control tone on the compressed communication signal through angle modulation. The demodulator angle demodulates the angle modulated compressed communication signal to obtain the control tone, and expands the angle modulated compressed communication signal based on the control tone.

50 Claims, 10 Drawing Sheets

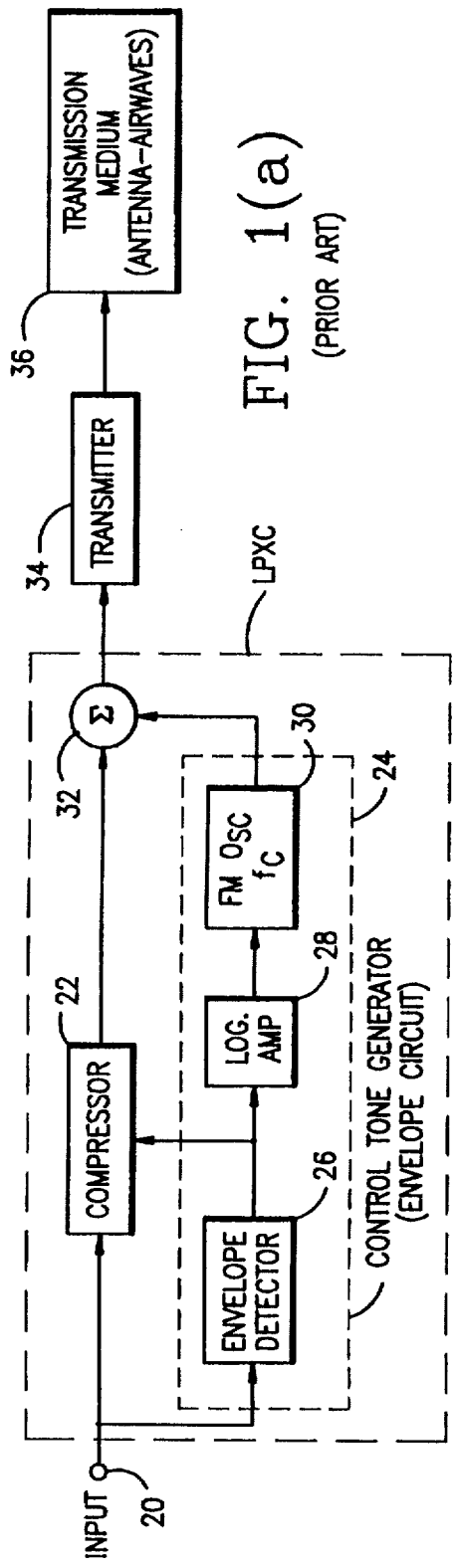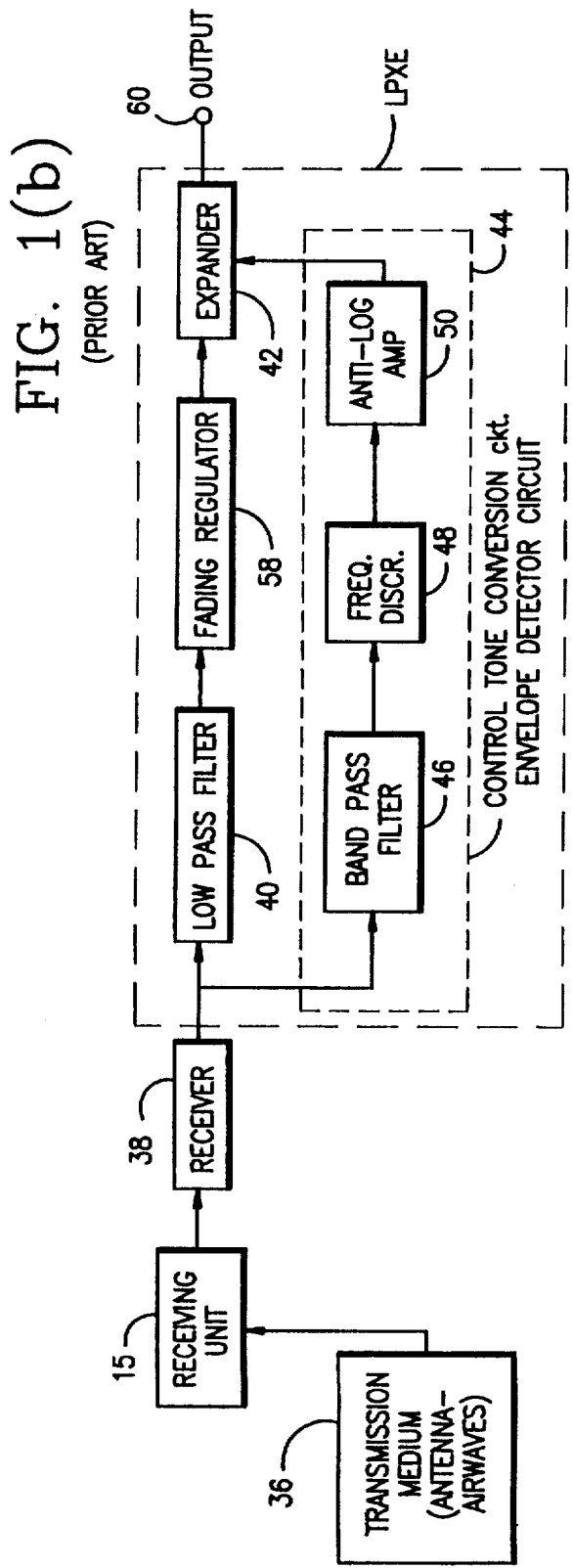

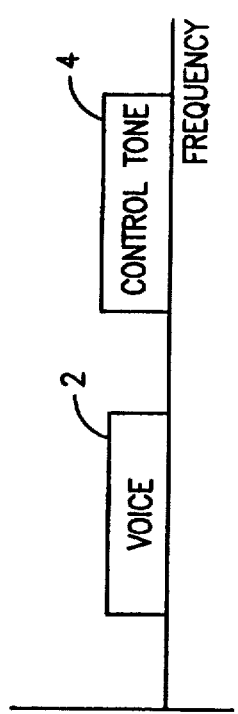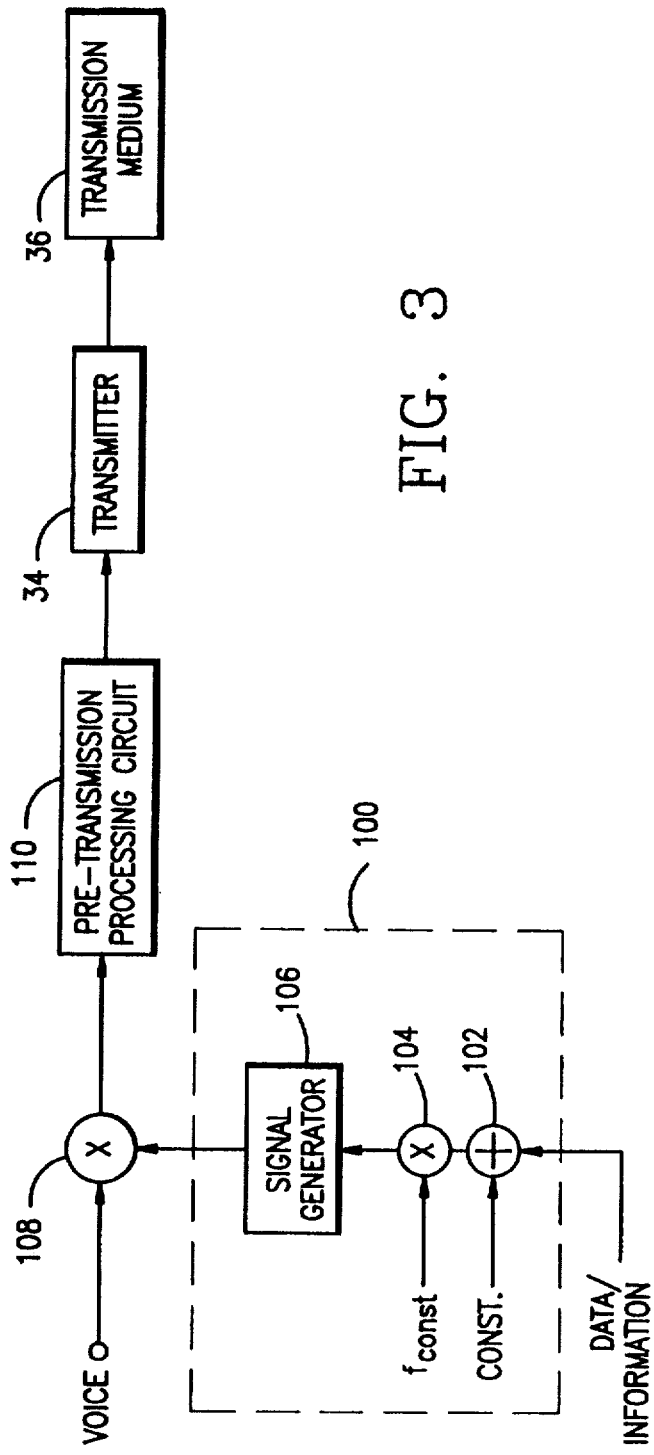

SYSTEM AND METHOD FOR TRANSMITTING AND RECEIVING A LINCOMPEX SIGNAL HAVING INFORMATION ENCODED THEREON THROUGH ANGLE MODULATION

BACKGROUND OF THE INVENTION

The present invention relates to a system and method for transmitting and receiving a band limited complex waveform having information encoded thereon through angle modulation of the complex waveform.

Conventional Lincompex Telecommunication Systems

Lincompex systems are well known in the telecommunications art. Such a digital Lincompex system is taught in U.S. Pat. No. 4,271,499 (the "'499 patent") entitled "Method and Apparatus for Digitally Implementing a Linked Compressor-Expander Telecommunications System" which issued Jun. 2, 1981, to Leveque, the Inventor of the present application. The '499 patent teaches transmitting a voice signal over a Lincompex system. It has been found, however, that, in addition to voice, Lincompex systems can be utilized to transmit any band limited complex waveform including parallel-tone and multi-tone data. A system that overcomes the inherent problem of envelope overlap when transmitting, for example, multi-tone data is fully disclosed in U.S. Pat. No. 4,907,217 (the "'217 patent"), also to Leveque, issued on Mar. 6, 1990, entitled "System and Method of Transmitting A Complex Waveform Over a Communication Channel Utilizing Lincompex Techniques".

In the voice transmission system, as disclosed in the '499 patent, a voice signal is transmitted using Lincompex techniques. This voice signal is band limited and exhibits a control tone 4 (according to the teachings of the '499 patent) which is also band limited and does not overlap the voice band 2, (see FIG. 2).

FIGS. 1(a) and 1(b) illustrate the Lincompex System of the '499 patent. In the modulator of FIG. 1(a) an input 20 of the Lincompex system modulator receives voice information for transmission. A control tone generator or envelope circuit 24 monitors the input voice signal. A compressor 22 compresses the introduced input voice signal. Compression is performed by dividing the signal by its envelope in pseudo-real time to produce a compressed voice signal. To develop the control tone, the system of FIG. 1(a) supplies the envelope signal developed from the output of the envelope detector 26 to a logarithmic (log) amplifier 28 which then develops a signal representative of the logarithm of the envelope signal. The output of this logarithmic amplifier 28 is supplied to a control terminal of a voltage controlled FM oscillator 30, which generates a frequency that varies about a center frequency $f_c$ in relation to the variation of the input voltage supplied to its control terminal from the logarithmic amplifier 28, to develop an envelope signal as an output of the control tone generator (envelope circuit) 24.

A summer 32 then sums the compressed voice signal developed at the output of the compressor 22 with the control tone developed at the output of the FM oscillator 30 to form a combined information signal. The summer 32, compressor 22 and control tone generator 24 form a Lincompex compressor LPXC.

In this speech transmission system, the combined information signal output from the summer 32 is provided to a transmitter 34 which transmits the signal over a desired transmission medium 36. In a typical embodiment, a single side band transmitter would normally transmit the modulated combined information signal across the airways in a known manner.

As illustrated in FIG. 1(b), the prior art Lincompex demodulator includes a receiving unit 15 which receives a modulated combined information signal from the transmission medium 36, which normally includes an antenna for receiving radio waves from the atmosphere, and supplies the received modulated combined information signal to a receiver 38. The receiver 38 demodulates the transmitted signal to produce a demodulated version of the combined information signal. Typically, this receiver 38 would be a single side band receiver which mixes the received modulated combined information signal with the channel frequency to produce a base band combined information signal.

To recover only the voice signal from such a combined voice/envelope information signal, a low pass filter 40 removes the control tone information 4 of FIG. 2 from the combined information signal to recover the compressed voice signal containing only the voice information 2. This compressed voice signal is transmitted according to the Lincompex techniques at a substantially complete modulation of the transmitter 34 of FIG. 1(a). The compressed voice signal is passed through a fading regulator 58. The fading regulator 58 is a fading regulator similar to the one described in the '499 patent which removes any audio level variations not removed by the automatic gain control circuitry in the receiver 38. This compressed modified voice signal output from the fading regulator 58 is then expanded to produce the necessary dynamic range for the recovered voice signal to be supplied at the output 60.

Accordingly, an expander 42, similar to the one described in the '499 patent, is utilized which essentially multiplies the compressed modified voice signal developed at the output of the fading regulator 58 by an envelope signal which is recovered by a control tone conversion circuit 44.

The control tone conversion circuit 44 comprises a band pass filter 46 which recovers only the control tone, represented by the control tone information signal 4 in FIG. 20. The control tone originally developed by the FM oscillator 30 of FIG. 1(a) is then passed through a frequency discriminator 48. The frequency discriminator 48 measures the instantaneous frequency of the control tone and produces a voltage level representative of this measured frequency. In this case, the voltage level also represents the logarithm of the original envelope signal. The anti-logarithm circuit 50 is utilized to recover the original envelope signal. This logarithmic signal is then supplied to an anti-logarithm circuit 50. The anti-logarithm circuit 50 is utilized to recover the original envelope developed by the envelope detector 26 of FIG. 1(a). This original envelope signal is used by the expander 42 to recover the original voice signal by expanding the compressed voice signal to provide the original signal to the output 60. This control tone conversion circuit 44 is similar to the control tone conversion circuit described in the '499 patent. The control tone conversion circuit 44, low pass filter 40, fading regulator 58, and expander 42 form a Lincompex expander LPXE.

With respect to the transmission of data, the Lincompex techniques used may or may not be different from the transmission of voice signals due to the complex nature of the data waveform. This technique is fully discussed in the '217 patent.

The above described Lincompex systems have been described with respect to single side band transmission and reception. It has been found, however, that Lincompex signals (ie, any complex waveform such as voice, parallel-tone data, and multi-tone data which under go Lincompex compression) can be transmitted and received utilizing frequency modulation. Such a system is fully disclosed in U.S. Pat. No. 5,058,202 (the "'202 patent"), also to Leveque, issued on Oct. 15, 1991, entitled "System and Method of Transmitting And Receiving A Lincompex Modulated Signal Over A Communication Channel Utilizing Frequency Modulation Techniques".

Angle Modulation

Angle modulation is modulation of the angle of the sinusoidal carrier. For examples a signal S(t) for a sinusoidal carrier may be expressed as $S(t)=A(t) \sin(W_c t+\Phi)$ where A(t) represents the amplitudes $W_c$ represents the frequency, $\Phi$ represents the phase and t represents time. Varying the frequency, or modulating $W_c$, is known as frequency modulation. Vary the phase, or modulating $\Phi$, is known as phase modulation. Both frequency modulation and phase modulation are forms of angle modulation.

The human ear is rather insensitive to angle distortions in speech such as distortions in the phase. In general, speech encounters all sorts of angle distortions in many speech applications while remaining "speech" to uncomplaining ears. Furthermore, systems involving the transmission of speech do not normally or accurately control angle distortion, particularly phase distortion. This distortion is just not considered an important design parameter since, typically, the distortion goes unnoticed. By contrast other modifications of the complex waveform representing speech, such as amplitude clipping, amplitude compression and additive noise, can be quite noticeable.

SUMMARY OF THE INVENTION

The inventor of the present invention conducted studies into the amounts of angle modulation possible before becoming noticeable to the human ear. The inventor discovered that a significant amount of angle modulation could be performed before becoming noticeable to the human ear. Based on these findings the inventor determined that through controlling the angle modulation, a separate data channel could, essentially, be encoded onto the complex waveform representing an audio signal (e.g., an audio signal representing human speech). In many applications, this will allow a reduction in the bandwidth of simultaneously transmitted speech and data signals. The angle modulation techniques, however, also apply to any data signal as well, so long as the added phase modulation does not corrupt or destroy the original data.

An object of the present invention is to provide a system and method for transmitting a band limited complex waveform having information encoded thereon through angle modulation of the complex waveform.

A further objective of the present invention is to provide a system and method for transmitting a complex waveform using lincompex techniques wherein data is encoded on the complex waveform using angle modulation.

An additional objective of the present invention is to provide a system and method for transmitting a complex waveform using lincompex techniques wherein the control tone is encoded on the complex waveform using angle modulation.

These and other related objectives are achieved by providing a method of transmitting a communication signal having data encoded thereon, comprising: (a) inputting data; (b) inputting a communication signal; (c) angle modulating said communication signal according to said data to produce said angle modulated communication signal; and (d) transmitting said angle modulated communication signal across a transmission medium.

These and other objects are further achieved by the above method wherein said step (c) comprises: (c1) generating a carrier signal; (c2) angle modulating said carrier signal according to said data to produce an angle modulated carrier signal; and (c3) modulating said communication signal according to said angle modulated carrier signal to produce said angle modulated communication signal.

These and other objects are also further achieved by the above method which further comprises: (e) modulating said communication signal according to Lincompex techniques to generate a compressed communication signal and a control tone; and wherein said step (c) angle modulates said compressed communication signal; and said step (d) transmits said angle modulated compressed communication signal and said control tone.

The objects and other objects are achieved by a method of receiving an angle modulated communication signal having data encoded thereon using angle modulation, comprising: (a) receiving said angle modulated communication signal from a transmission medium; and (b) angle demodulating said angle modulated communication signal to obtain said data.

Additionally, these and other objects are achieved by a method for receiving an angle modulated compressed communication signal having a control tone encoded thereon using angle modulation wherein Lincompex techniques are applied to a communication signal to produce a compressed communication signal and a control tone, and said control tone is encoded on said compressed communication signal using angle modulation to produce said angle modulated compressed communication signal, comprising: (a) receiving said angle modulated compressed communication signal from a transmission medium; (b) angle demodulating said angle modulated compressed communication signal to obtain said control tone; and (c) demodulating said angle modulated compressed communication signal according to Lincompex techniques using said control tone obtained in step (b) to recover said angle modulated communication signal.

These and other related objectives are further achieved by providing an apparatus for transmitting a communication signal having data encoded thereon, comprising: angle modulating means for inputting data, inputting a communication signal, and for angle modulating said communication signal according to said data to produce said angle modulated communication signal; and a transmitter transmitting said angle modulated communication signal across a transmission medium.

These and other related objects are also achieved by providing the above apparatus wherein said angle modulating means comprises: an angle modulator generating a carrier signal, and angle modulating said carrier signal according to said data to produce an angle modulated carrier signal; and first modulating means for modulating said communication signal according to said angle modulated carrier signal to produce said angle modulated communication signal.

These and other related objects are still further achieved by providing the above apparatus further comprising: a Lincompex modulator modulating said communication signal according to Lincompex techniques to generate a compressed communication signal and a control tone; and wherein said first modulating means modulates said compressed communication signal according to said angle modulated carrier signal; and said transmitter transmits said angle modulated compressed communication signal and said control tone.

These and other objects are additionally achieved by providing an apparatus for receiving an angle modulated communication signal having data encoded thereon using angle modulation, comprising: a receiver receiving said angle modulated communication signal from a transmission medium; and an angle demodulator angle demodulating said angle modulated communication signal to obtain said data.

Additionally, these and other objects are achieved by providing an apparatus for receiving an angle modulated compressed communication signal having a control tone encoded thereon using angle modulation wherein Lincompex techniques are applied to a communication signal to produce a compressed communication signal and a control tones and said control tone is encoded on said compressed communication signal using angle modulation to produce said angle modulated compressed communication signal, comprising: a receiver receiving said angle modulated compressed communication signal from said transmission medium; an angle demodulator angle demodulating said angle modulated compressed communication signal to obtain said control tone; and a Lincompex demodulator demodulating said angle modulated compressed communication signal according to Lincompex techniques using said control tone obtained by said angle demodulator to recover said angle modulated communication signal.

These and other related objectives of the present invention will become more readily apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description hereinbelow and the accompanying drawings which are given by way of illustration only, and thus do not limit the present invention.

FIGS. 1(a) and 1(b) illustrate a prior art Lincompex modulator and demodulator;

FIG. 2 illustrates the typical relationship between the frequency band of typical human voice and the control tone of this voice;

FIG. 3 illustrates a modulator according to a first embodiment of the present invention;

DETAILED DESCRIPTION OF THE PREFERRED EMBODIMENTS

Figure 4C:
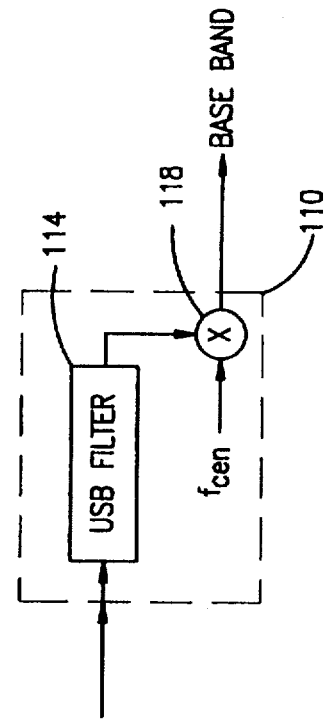
FIGS. 4(a)–4(c) illustrate embodiments of the pre-transmission processing circuit.

In the description of the embodiments which follow, like reference numerals are used for like elements, and, accordingly, descriptions of these previously described elements are not repeated FIG. 3 illustrates a modulator according to a first embodiment of the present invention. The modulator includes a multiplier 108 inputting a band limited complex waveform or signal, such as a voice signal or data signal, and the output of an angle modulator 100. Hereinafter, the band limited complex waveform or signal will be referred to as a communication signal. A pre-transmission processing circuit 110 receives and processes the angle modulated communication signal output by the multiplier 108. A transmitter 34 transmits the angle modulated communication signal output by the pre-transmission processing circuit 110 across a transmission medium 36.

The angle modulator 100 includes an adder 102 which inputs data or information for encoding on the communication signal and a constant CONST. A multiplier 104 multiplies the output of the adder 102 with a signal $f_{const}$ having a constant amplitude and frequency to produce a modulating signal. The angle modulator 100 further includes a signal generator 106 which generates a carrier signal with a center frequency of $f_{cen}$. The signal generator 106 angle modulates the carrier signal about the center frequency $f_{cen}$ in accordance with the modulating signal output by the multiplier 104. The operation of the angle modulator 100 and the rest of the modulator illustrated in FIG. 3 is described in detail below.

Figure 5:
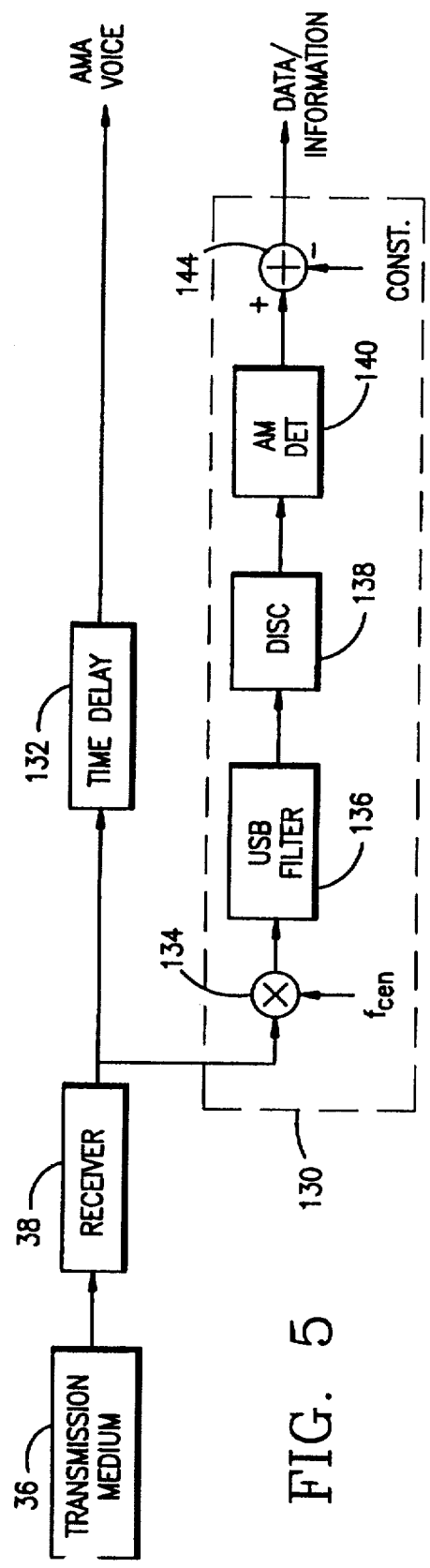
FIG. 5 illustrates a demodulator according to a first embodiment of the present invention.

FIG. 5 illustrates a demodulator, corresponding to the modulator in FIG. 3, according to a first embodiment of the present invention. In the demodulator of FIG. 5, a receiver 38 receives an angle modulated communication signal from the transmission medium 36. Both a time delay circuit 132, an optional component, and an angle demodulator 130 receive the angle modulated communication signal output by the receiver 38.

The angle demodulator 130 angle demodulates the angle modulated communication signal to obtain the data encoded thereon. The angle demodulator 130 includes a multiplier 134 which multiplies the angle modulated communication signal by a signal of constant frequency $f_{cen}$ (i.e., the carrier signal center frequency). An upper side band filter 136; a discriminator 138, and an amplitude detector 140 are connected in series to the output of the multiplier 134. A subtractor 144 receives the output of the amplitude detector 140, and subtracts the constant CONST from the output of the amplitude detector 140 to obtain the data encoded on the angle modulated communication signal. The operation of the angle demodulator 130 and the rest of the demodulator illustrated in FIG. 5 is discussed in detail below.

Figure 6:
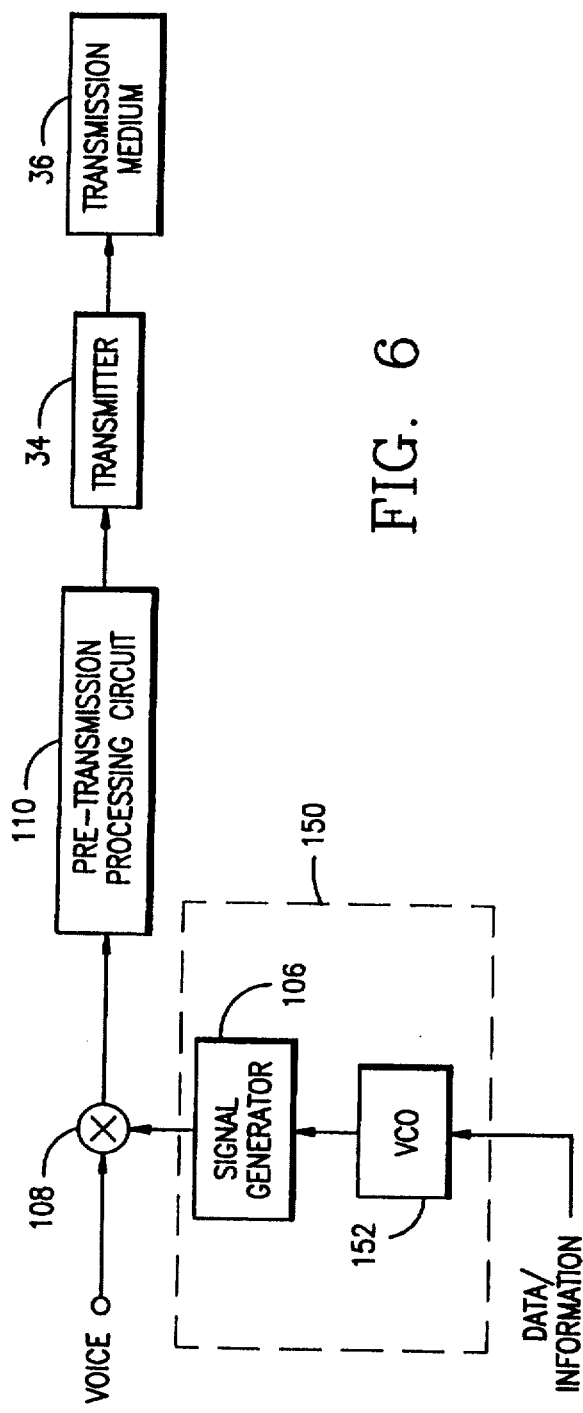
FIG. 6 illustrates a modulator according to a second embodiment of the present invention.

FIG. 6 illustrates a modulator according to a second embodiment of the present invention. The modulator of FIG. 6 differs from the modulator in FIG. 3 in that the angle modulator 150 has replaced the angle modulator 100. Therefore, the remaining components of the modulator illustrated in FIG. 6 will not be described, since to do so would merely be repetitive of the description above with respect to FIG. 3.

The modulator 150 includes a voltage controlled oscillator 152 which inputs the data for encoding on the communication signal, and outputs a modulating signal to the signal generator 106. The signal generator 106 generates and outputs an angle modulated carrier signal based on the modulating signal. The operation of the modulator 150 is discussed in detail below.

Figure 7:
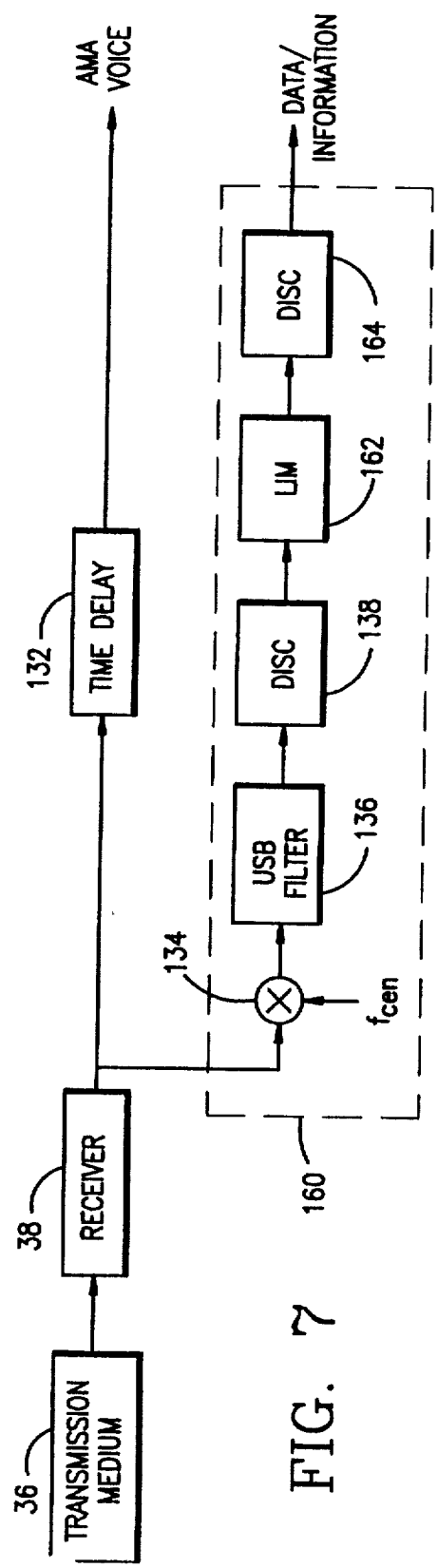
FIG. 7 illustrates a demodulator according to a second embodiment of the present invention.

FIG. 7 illustrates a demodulator, corresponding to the modulator in FIG. 6, according to a second embodiment of the present invention. The demodulator of FIG. 7 differs from the demodulator in FIG. 5 in that the angle demodulator 160 has replaced the angle modulator 130. Therefore, the remaining components of the demodulator illustrated in FIG. 7 will not be described, since to do so would merely be repetitive of the description above with respect to FIG. 5.

The angle demodulator 160 angle demodulates the angle modulated communication signal to obtain the data encoded thereon. Like angle demodulator 130, the angle demodulator 160 includes the multiplier 134, which multiplies the angle modulated communication signal by the signal of constant frequency $f_{cen}$, and the upper side band filter 136 and the discriminator 138 connected in series to the output of the multiplier 134. A limiter 162 and a second discriminator 164 are connected in series to the output of the discriminator 138. The second discriminator 164 outputs the data encoded on the angle modulated communication signal. The operation of the angle demodulator 160 illustrated in FIG. 7 is discussed in detail below.

Figure 8:
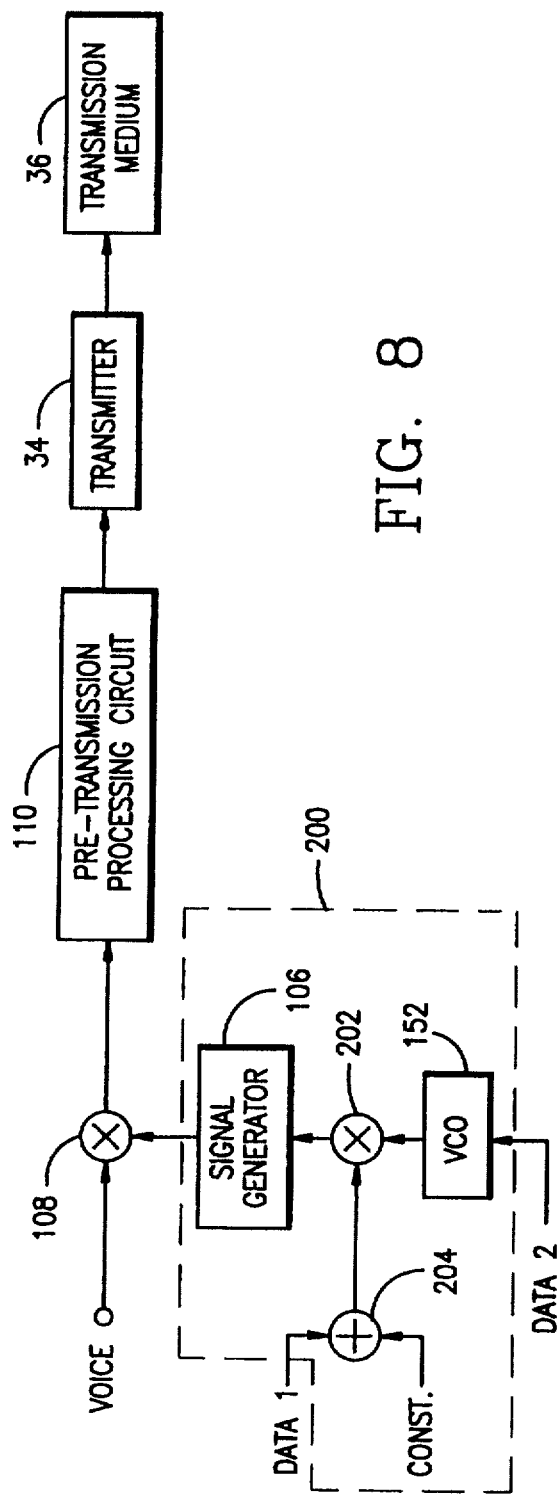
FIG. 8 illustrates a modulator according to a third embodiment of the present invention.

FIG. 8 illustrates a modulator according to a third embodiment of the present invention. The modulator of FIG. 8 differs from the modulator in FIG. 3 in that the angle modulator 200 has replaced the angle modulator 100. Therefore, the remaining components of the modulator illustrated in FIG. 8 will not be described, since to do so would merely be repetitive of the description above with respect to FIG. 3.

The angle modulator 200 provides for encoding first and second data on a communication signal, and is a combination of the angle modulator 100 and the angle modulator 150 illustrated in FIGS. 3 and 6, respectively. Thus, like components have like reference numerals in FIG. 8. The angle modulator 200 includes the voltage controlled oscillator 152 which inputs first data for encoding on the communication signal, and which outputs a first modulating signal. An adder 204 adds the constant CONST and second data for encoding on the communication signal. A multiplier 202 multiplies the first modulating signal and the output of the adder 204 to produce a second modulating signal. The signal generator 106 generates and outputs an angle modulated carrier signal based on the second modulating signal. The operation of the modulator 200 is discussed in detail below.

Figure 9:
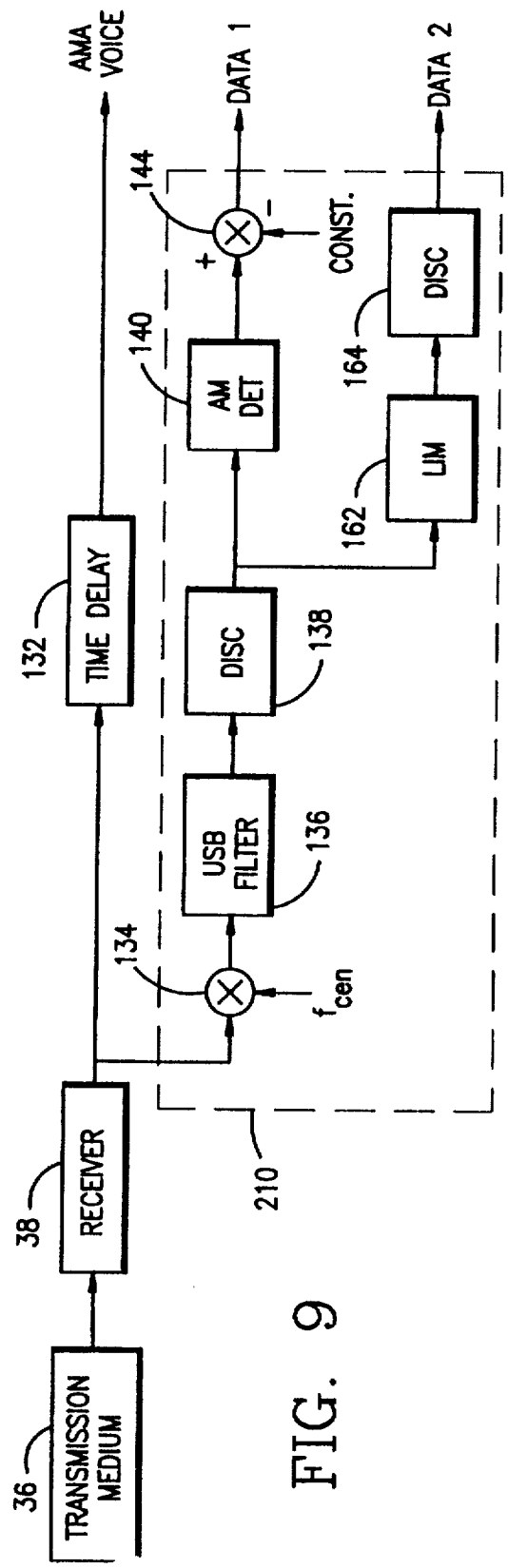
FIG. 9 illustrates a demodulator according to a third embodiment of the present invention.

FIG. 9 illustrates a demodulator, corresponding to the modulator in FIG. 8, according to a third embodiment of the present invention. The demodulator of FIG. 9 differs from the demodulator in FIG. 5 in that the angle demodulator 210 has replaced the angle modulator 130. Therefore, the remaining components of the demodulator illustrated in FIG. 9 will not be described, since to do so would merely be repetitive of the description above with respect to FIG. 5.

The angle demodulator 210 is a combination of the angle demodulator 130 and the angle demodulator 160 illustrated in FIGS. 5 and 7, respectively. The angle demodulator 210 angle demodulates the angle modulated communication signal to obtain the first and second data encoded thereon. The angle demodulator 210 is essentially the same as the angle demodulator 130 with the limiter 162 and the second discriminator 164 (1) connected in series to the output of the discriminator 138 and (2) connected in parallel with the amplitude detector 140 and the subtractor 144. The operation of the angle demodulator 210 illustrated in FIG. 9 is discussed in detail below.

Figure 10:
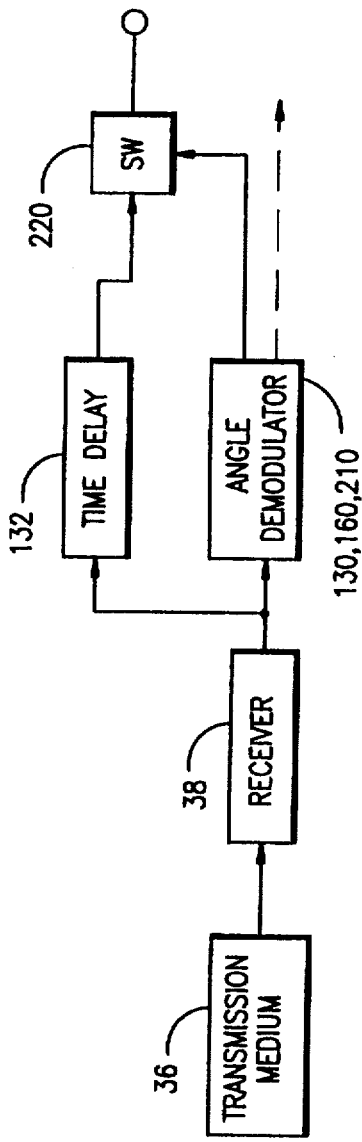
FIG. 10 illustrates a possible application of the present invention.

FIG. 10 illustrates one possible application of the demodulator according to the present invention. The demodulator embodiment of FIG. 10 is the same as the demodulator embodiments illustrated in FIGS. 5, 7, and 9 with the addition of a switch 220. The switch 220 receives and selectively outputs the output of the optional time delay circuit 132 based on the data output from the angle demodulator 130, 160 or 210. The operation of the embodiment illustrated in FIG. 10 is described in detail below.

Next, the embodiments of FIGS. 11–14 will be described. Since the embodiments of FIGS. 11–14 contemplate the use of digital Lincompex techniques along with the teachings of the present invention, to the extent necessary, applicant hereby incorporates by reference the entire disclosures of U.S. Pat. No. 4,271,499 entitled "Method and Apparatus for Digitally Implementing a Linked Compressor-Expander Telecommunications System"; U.S. Pat. No. 4,907,217 entitled "System and Method of Transmitting A Complex Waveform Over a Communication Channel Utilizing Lincompex Techniques"; U.S. Pat. No. 5,058,202, entitled "System and Method of Transmitting And Receiving A Lincompex Modulated Signal Over A Communication Channel Utilizing Frequency Modulation Techniques"; and U.S. Pat. No. 4,944,024, entitled "Method and Apparatus for Reducing Noise in a Linked Compressor-Expander Telecommunications System" to Leveque, the Inventor of the present application, into the specification of the present application.

Figure 11:
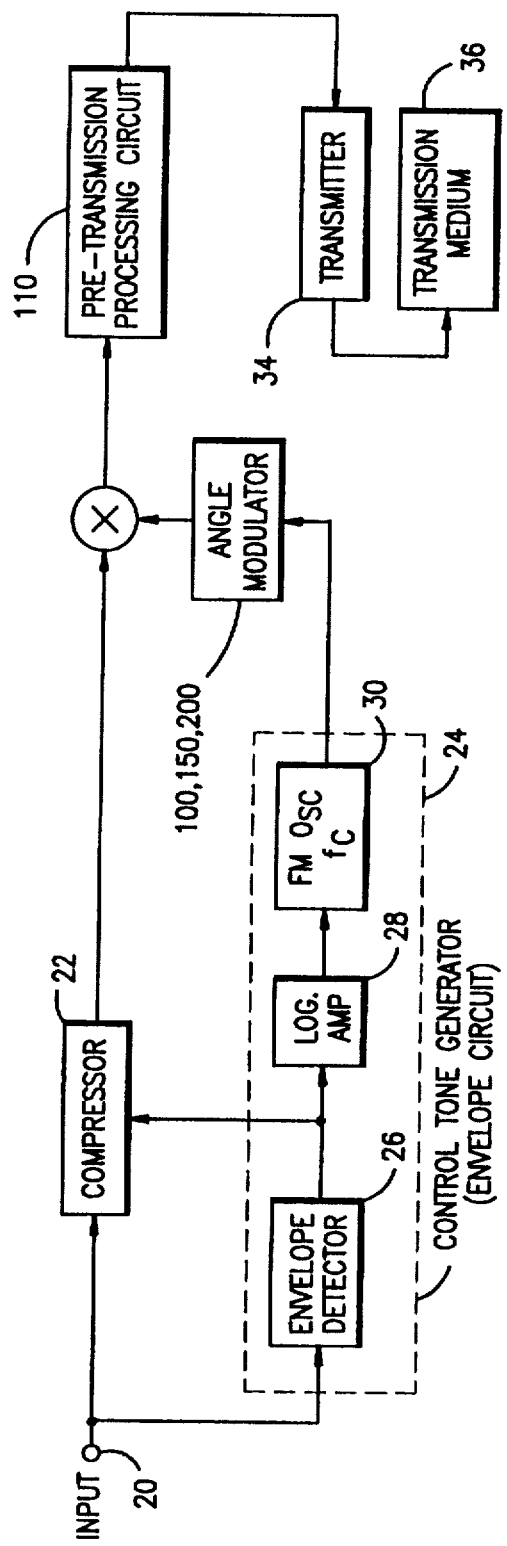
FIG. 11 illustrates an application of the modulator according to the present invention to Lincompex communication.

FIG. 11 illustrates a modulator according to a another embodiment of the present invention. The modulator of FIG. 11 is substantially the same as the modulator embodiments illustrated in FIGS. 3, 6 and 8 with the addition of the compressor 22, the control tone generator 24 and a multiplier 224 replacing the multiplier 108. The operation and connection between the compressor 22 and control tone generator 24 were discussed in detail previously, and therefore, will not be repeated. Similarly, the components included in the control tone generator 24 were discussed in detail previously, and therefore, will not be repeated.

The compressor 22 inputs the communication signal and outputs a compressed communication signal to the multiplier 224. The angle modulator 100, 150, or 200 receives the control tone from the control tone generator 24 as the data for encoding, and produces an angle modulated carrier signal based on the control tone. The multiplier 224 multiplies the compressed communication signal and the angle modulated carrier signal, and outputs an angle modulated compressed communication signal to the pre-transmission processing circuit 110. The operation of the embodiment illustrated in FIG. 11 is discussed in detail below.

Figure 12:
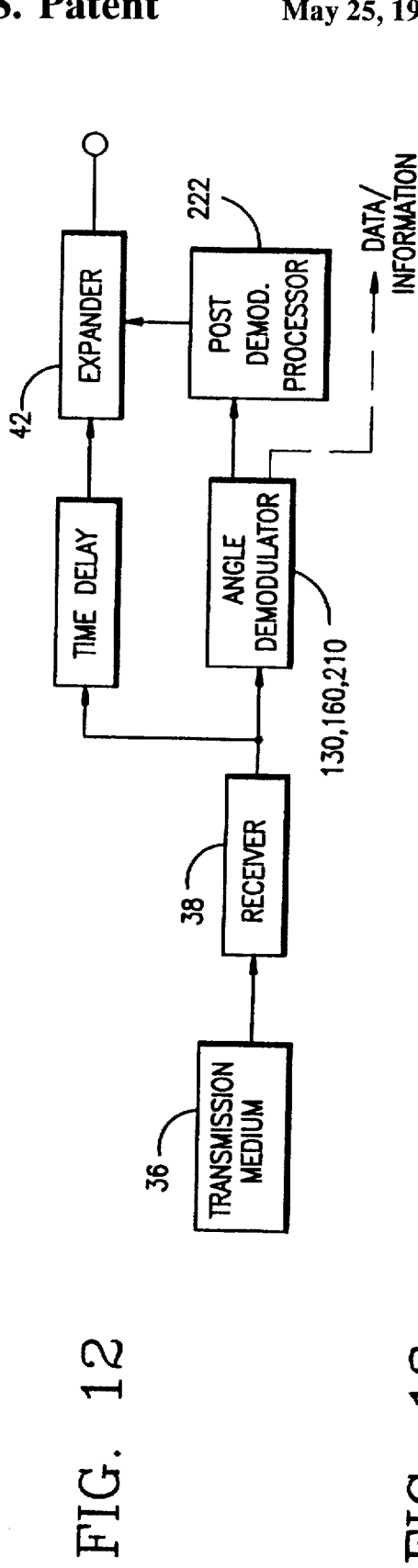
FIG. 12 illustrates an application of the demodulator according to the present invention to Lincompex communication.

FIG. 12 illustrates a demodulator, corresponding to the modulator illustrated in FIG. 11, according to another embodiment of the present invention. The demodulator of FIG. 12 is substantially the same as the demodulator embodiments illustrated in FIGS. 5, 7, and 9 with the addition of the expander 42 and the post demodulator processor 222. The expander 42 was discussed in detail previously, and therefore, will not be repeated. The post demodulator processor 222 receives the control tone from the angle demodulator 130, 160, 210 since the encoded data is the control tone. From the control tone, the post demodulator processor 222 produces and outputs an envelope signal representing an envelope of the communication signal. The expander 42 expands the compressed communication signal based on the envelope signal. The operation of the embodiment illustrated in FIG. 12 is discussed in detail below.

Figure 13:
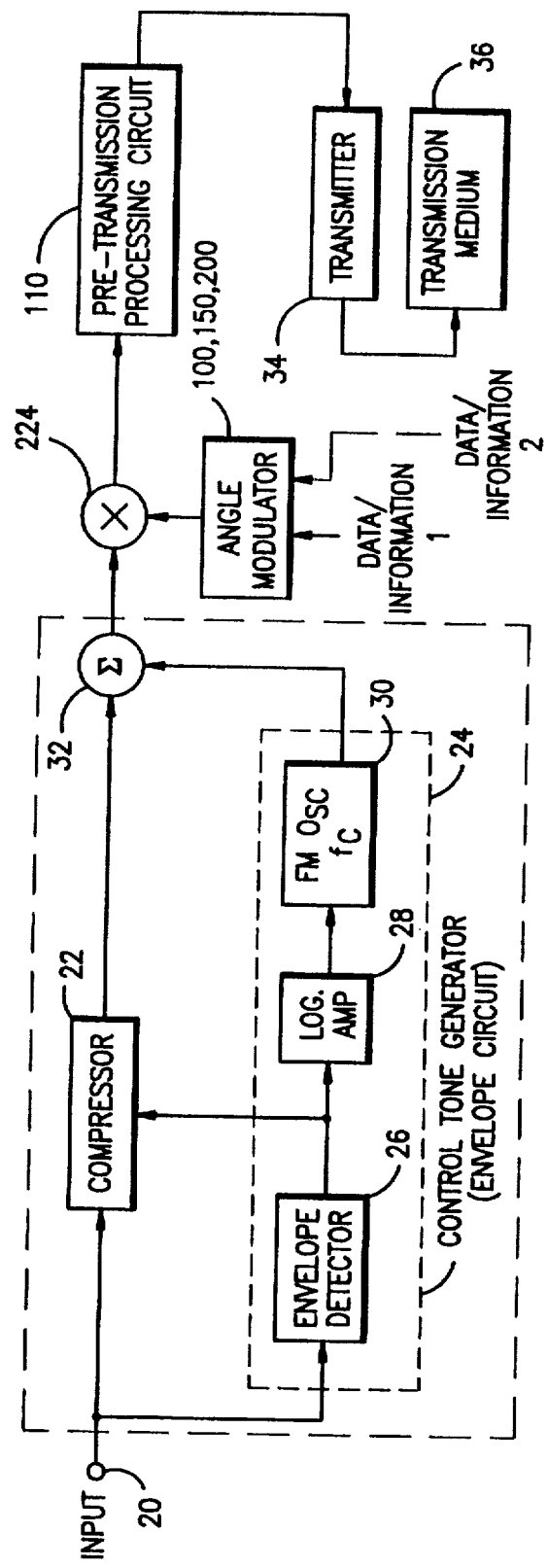
FIG. 13 illustrates an application of the modulator according to the present invention to Lincompex communication.

FIG. 13 illustrates a modulator according to a another embodiment of the present invention. The modulator of FIG. 13 is substantially the same as the modulator embodiments illustrated in FIGS. 3, 6, and 8 with the addition of the compressor 22, the control tone generator 24, the summer 32, and the multiplier 224 replacing the multiplier 108. The operation and connection between the compressor 22, the control tone generator 24, and the summer 32 were discussed in detail previously, and therefore, will not be repeated. Similarly, the components included in the control tone generator 24 were discussed in detail previously, and therefore, will not be repeated.

The compressor 22 inputs the communication signal and outputs a compressed communication signal to the summer 32. The control tone generator 24 also receives the communication signal and generates a control tone corresponding thereto. The summer 32 adds the compressed communication signal and the control tone. The multiplier 224 multiplies the output of the summer 32 and the angle modulated carrier signal, and outputs an angle modulated compressed communication signal plus the control tone to the pre-transmission processing circuit 110. The operation of the embodiment illustrated in FIG. 13 is discussed in detail below.

Figure 14:
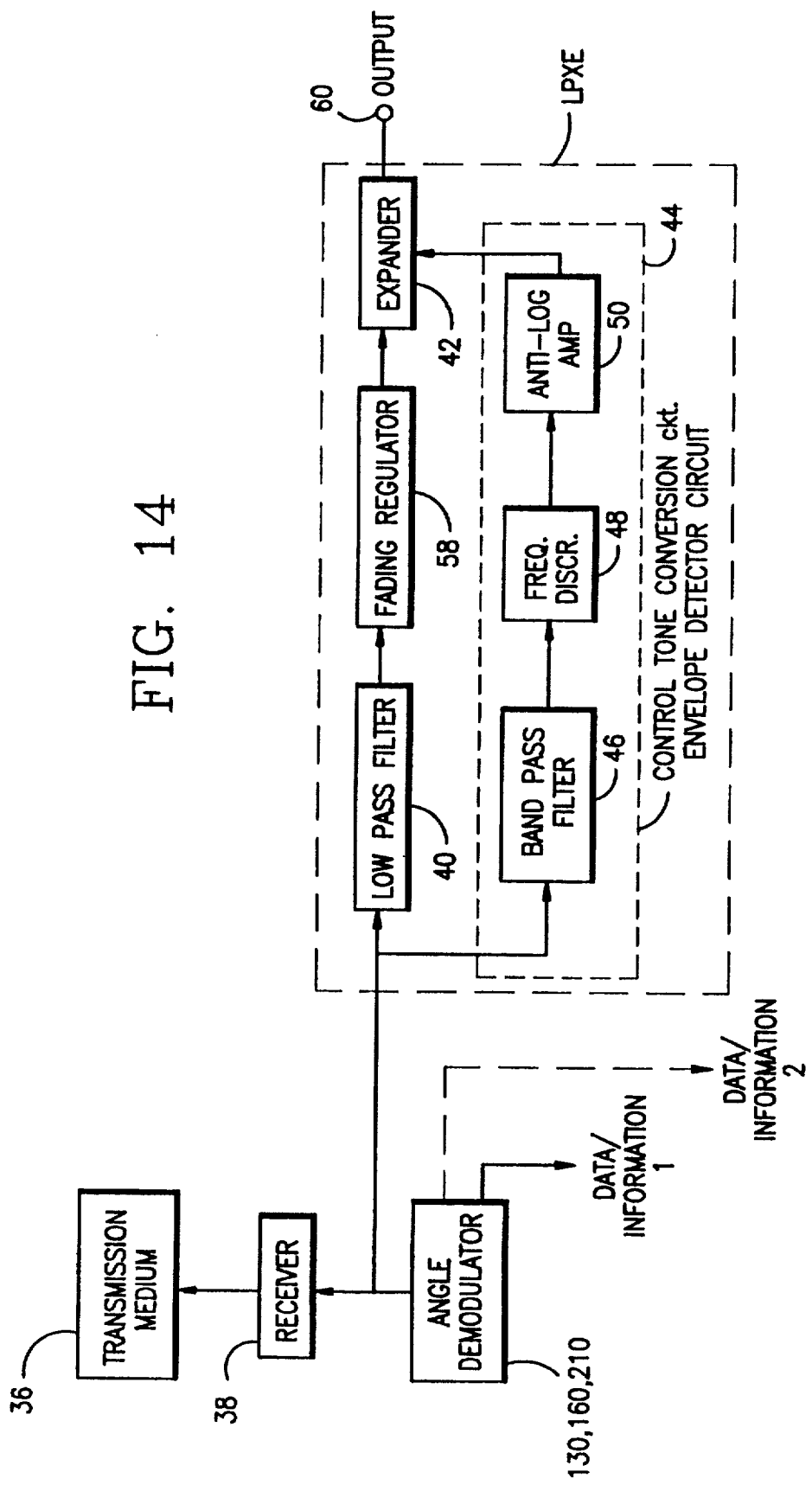
FIG. 14 illustrates an application of the demodulator according to the present invention to Lincompex communication.

FIG. 14 illustrates a demodulator, corresponding to the modulator illustrated in FIG. 13, according to another embodiment of the present invention. The demodulator of FIG. 14 is substantially the same as the demodulator embodiments illustrated in FIGS. 5, 7, and 9 with the addition of the low-pass filter 40, the fading regulator 58, the expander 42, the band-pass filter 46, the frequency discriminator 48, and the anti-logarithm circuit 50. The low-pass filter 40, the fading regulator 58, the expander 42, the band-pass filter 46, the frequency discriminator 48, and the anti-logarithm circuit 50 were discussed in detail previously, and therefore, will not be repeated.

The low-pass filter 40, the fading regulator 58, the expander 42, the band-pass filter 46, the frequency discriminator 48, and the anti-logarithm circuit 50 form a Lincompex expander LPXE. The Lincompex expander LPXE receives the angle modulated compressed communication signal plus the control tone from the receiver 38, and produces an angle modulated communication signal. The operation of the embodiment illustrated in FIG. 14 is discussed in detail below.

OPERATION OF THE PRESENT INVENTION

Next, the operation of the embodiments discussed above will be described in detail.

Figure 15A:
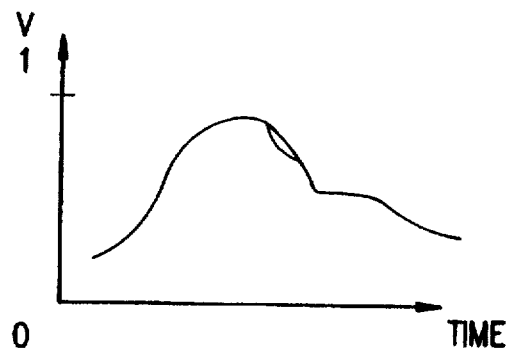
FIGS. 15(a)–15(c) illustrate waveforms of signals output by components of the angle modulator illustrated in FIG. 3.
Figure 15B:
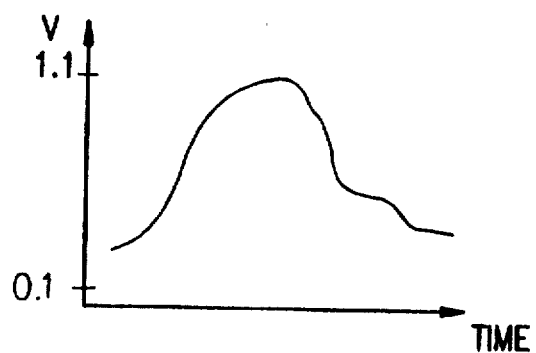

In FIG. 3, the angle modulator 100 inputs data or information such as illustrated in FIG. 15(a). The adder 102 adds a constant CONST to the data, and outputs the data shifted by the constant CONST as illustrated in FIG. 15(b). As illustrated in FIG. 15(b) the value for the constant CONST is chosen as 0.1 V. The value of the constant CONST, however, is not limited to this value. Furthermore, the addition of a constant is not necessary, but does prevent substantially no output from multiplier 104 when the data is zero. Consequently, shifting by a constant helps reduce noise, and prevent the demodulator from losing a lock on the encoded data. As discussed in detail below, the value of the constant CONST, may be chosen based on the desired angle modulation factors.

Figure 15C:
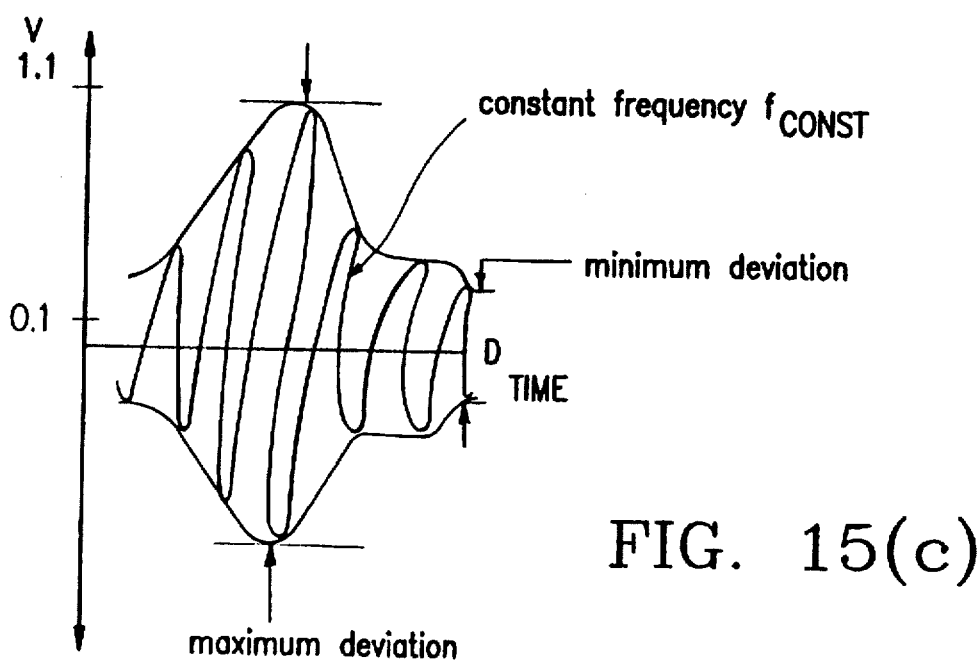

The multiplier 104 multiplies the output of the adder 102 with the signal $f_{const}$ of constant frequency and amplitude to produce a modulating signal as illustrated in FIG. 15(c). For example, the constant frequency and amplitude signal $f_{const}$ may have a frequency of 10–20 hz. The constant frequency and amplitude signal $f_{const}$, however, is not limited to having a frequency within this range. The frequency of the constant frequency and amplitude signal $f_{const}$ depends on the telecommunication system being used such as the type of band limited complex waveform being transmitted, the type of transmitter, and the transmission medium.

The signal generator 106 generates a carrier signal having a constant frequency and amplitude. In the present embodiment, the frequency $f_{cen}$ of the carrier signal is 10 Mhz. The frequency $f_{cen}$ of the carrier signal, however, is not limited to this frequency. The frequency of the carrier signal depends on the telecommunication system being used such as the type of band limited complex waveform being transmitted, the type of transmitter, and the transmission medium. The signal generator 106 has an angle modulation input. Based on the modulating signal received at the angle modulation input, the signal generator 106 angle modulates the carrier signal. FIG. 15(c) identifies the factors or attributes of the modulating signal received at the angle modulation input upon which the signal generator 106 basis the angle modulation. Those angle modulation attributes include: the maximum deviation of the amplitude of the modulating signal, the minimum deviation of the amplitude of the modulating signal, and the frequency of the modulating signal. These factors are set so that the embodiment is compatible with desired transmission and reception requirements.

The signal generator 106 may be a commercially available signal generator such as Hewlett Packard's HP8644B Signal Generator wherein the angle modulation input is the MOD FREQ/MOD DEV input. The signal generator 106, however, is not limited to this particular signal generator. Since the operation and functions of such signal generators are well known, the manner in which the signal generator 106 performs angle modulation based on a signal input to the angle modulation input will not be described since this is well known as well.

Figure 16A:
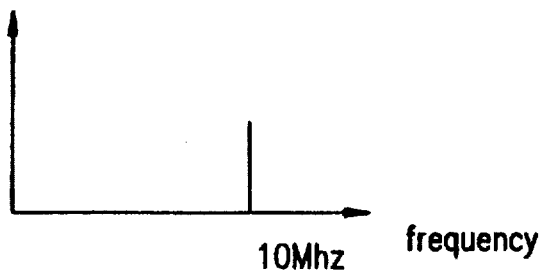
FIGS. 16(a)–16(d) illustrate waveforms of signals output by components of the modulator illustrated in FIG. 3.
Figure 16B:
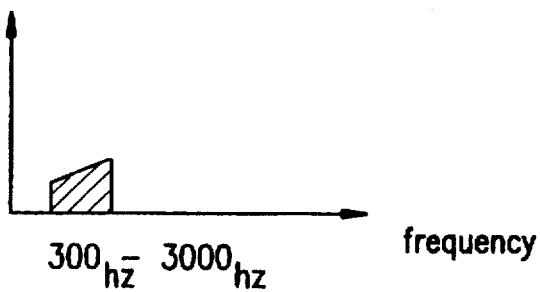
Figure 16C:
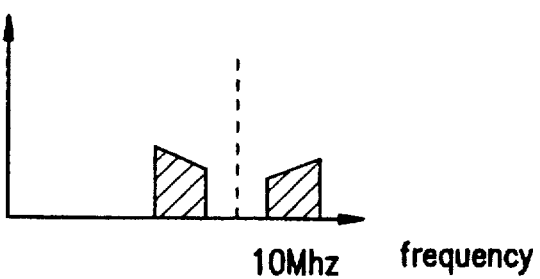

The signal generator 106, thus, outputs an angle modulated carrier signal such as shown in FIG. 16(a). Since the angle modulations are small compared to the frequency scale in FIG. 16(a), FIG. 16(a) does not readily portray those frequency variations. The multiplier 108 multiplies the angle modulated carrier signal by the communication signal. Since, as discussed above, the communication signal in one possible embodiment is a voice signal, FIG. 16(b) illustrates the frequency band of the human voice. FIG. 16(c) illustrates the angle modulated communication signal output by the multiplier 108.

Figure 4A:
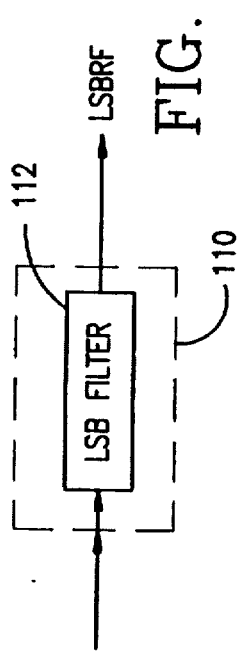
Figure 4B:
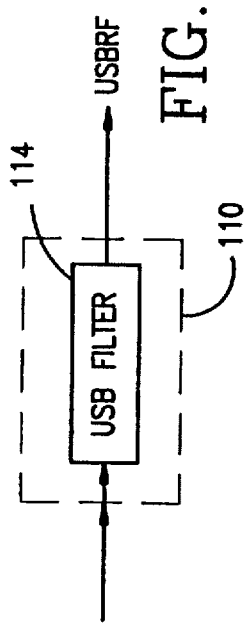

The pre-transmission processing circuit 110 then operates on the angle modulated communication signal. FIGS. 4(a)–4(c) illustrate three possible embodiments of the pre-transmission processing circuit 110. In FIG. 4(a), the pre-transmission processing circuit 110 includes a lower side band filter 112 which only passes the lower side band of the angle modulated communication signal. In FIG. 4(b), the pre-transmission processing circuit 110 includes an upper side band filter 114 which only passes the upper side band of the angle modulated communication signal. In FIG. 4(c), the pre-transmission processing circuit 100 includes an upper side band filter 114 and a multiplier 118. The upper side band filter 114 only passes the upper side band of the angle modulated communication signal. The multiplier 118 multiplies the output of the upper side band filter 114 by a signal having constant frequency $f_{cen}$ (i.e., the carrier signal frequency) to return the angle modulated communication signal to base band.

Figure 16D:
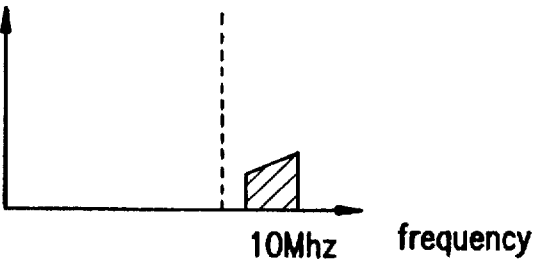

Assuming the pre-transmission processing circuit 110 is as illustrated in FIG. 4(b), then FIG. 16(d) illustrates the angle modulated communication signal output from the pre-transmission processing circuit 110. The transmitter 34 then transmits the angle modulated communication signal output from the pre-transmission processing circuit 110 across the transmission medium 36.

The transmission medium 36 utilized in the present invention may be any type of transmission medium for example, an atmospheric radio wavelengths a telephone line, coaxial cable or fiber optic cable, or any other path usable for the transmission of the band limited complex waveform such as voice or data. Also, the components of the information waveform can be sent via separate transmission mediums.

The transmitter 34 may operate according to any well known analog or digital modulation or transmission technique such as AM, FM, PM, PCM, ASK, QPSK, π/4 DQPSK, BPSK, OQPSK, MSK, FSK, CPFSK, MFSK, GMSK, GFSK, and CVSD. As the discussion above with respect to the transmission medium indicates, the transmitter 34 may perform both long and short range wireless transmission.

Therefore, the modulator according to the present invention is able to transmit a band limited complex waveform (e.g., an audio signal or a data signal) using only the bandwidth necessary for the transmission of the band limited complex waveform. As such, an additional and separate frequency band is not required for transmitting the data, and the bandwidth of the transmission in the present invention is significantly reduced compared to convention devices and methods.

If the angle deviation, frequency or phase, imparted to the communication signal is too great, however, then such deviations become noticeable to the listener, if an audio signal is being transmitted, or to the data processing device, if data is being transmitted. This "distortion level" varies depending on the method of transmission, the environment, and the communication signal. Additionally, the angle modulation can reach a point where the communication signal or portions of the communication signal are destroyed. This "deterioration level", like the distortion level, varies depending on the method of transmission, the environment, and the communication signal. Accordingly, any type of data may be encoded on the communication signal as long as the angle modulation required to encode the data does not exceed the deterioration level. Exceeding the distortion level, however, may be acceptable in some applications.

Next, the operation of the demodulator illustrated in FIG. 5 will be described. The receiver 38 receives the angle modulated communication signal from the transmission medium 36. The time delay circuit 132 and the angle demodulator 130 receive the angle modulated communication signal from the receiver 38. The time delay circuit 132 is an optional component. The time delay circuit 132 delays outputting the angle modulated communication signal by the amount of time necessary for the angle demodulator 130 to perform the angle demodulation. In this manner the time delay circuit 132 synchronizes the angle modulated communication signal and the data produced by the angle demodulator 130. Some applications do not require such synchronization, and in those applications, the time delay circuit 132 can be eliminated.

The multiplier 134 of the angle demodulator 130 receives the angle modulated communication signal, and returns the angle modulated communication signal to base band by multiplying the angle modulated communication signal with a signal of constant frequency $f_{cen}$ (i.e., the carrier signal frequency). The upper side band filter 136 receives the angle modulated communication signal from the multiplier 134, and only passes the upper side band thereof.

The discriminator 138 converts the frequency variations of the output of the upper side band filter 136 into voltage variations. The output of the discriminator 138 is substantially the modulating signal input by the signal generator 106 as shown in FIG. 15(c). The amplitude detector 140 determines and outputs the envelope of the modulating signal. The output of the amplitude detector 140 is substantially the same as the output of the adder 102 illustrated in FIG. 15(b). The subtractor 144 subtracts the constant CONST from the output of the amplitude detector 140 to obtain the data.

As discussed above, the time delay circuit 132 outputs the angle modulated communication signal. When this signal is an audio signal and the angle modulations are substantially inaudible, no further processing of the angle modulated communication signal is necessary before presentation to a listener via, for example, a speaker. The same is true in some applications where the angle modulated communication signal is a data signal. The data signal, however, is supplied to a data processor as opposed to a speaker.

There exist a multitude of applications for the present invention. For instance, the data could include information for improving the signal-to-noise ratio of the angle modulated communication signal. By contrast, the data encoded on the angle modulated communication signal could be totally unrelated to the angle modulated communication signal. FIGS. 10–12 illustrate further possible applications of the present invention. These applications are merely examples, and by no means exhaust the possible applications.

Furthermore, the present invention can encode and transmit data on a communication signal using angle modulation such that the transmitted and received angle modulated communication signal fits into existing communications bandwidths; thus, requiring no equipment changes.

Next, the operation of the modulator illustrated in FIG. 6 will be described. Since, as discussed above, the modulator of FIG. 6 only differs from the modulator of FIG. 3 in that the angle modulator 150 has replaced the angle modulator 100, only the operation of the angle modulator 150 will be described.

The voltage controlled oscillator 152 inputs the data for encoding on the communication signal, and generates a modulating signal having a constant amplitude and a varying frequency. The voltage controlled oscillator 152 varies the frequency of the modulating signal based on the data. The signal generator 106 receives the modulating signal at its angle modulation input, and angle modulates the carrier signal according to the modulating signal. While the angle modulator 100 of FIG. 3 controlled the angle modulation of the carrier signal by changing the amplitude of the modulating signal, the angle modulator 150 controls the angle modulation of the carrier signal by changing the frequency of the modulating signal.

The advantages and restrictions discussed above with respect to the modulator of FIG. 3 equally apply to this modulator embodiment.

Next, the operation of the demodulator illustrated in FIG. 7 will be described. Since, as discussed above, the demodulator of FIG. 7 only differs from the demodulator of FIG. 5 in that the angle demodulator 160 has replaced the angle demodulator 130, only the operation of the angle demodulator 160 will be described.

Like the angle demodulator 130, the angle demodulator 160 includes the adder 134, the upper side band filter 136 and the discriminator 138 which receive the angle modulated communication signal and output the modulating signal. Therefore, a detailed description of the operation of these components will not be repeated.

The limiter 162 receives the modulating signal output by the discriminator 138, and removes amplitude variations from the modulating signal. As discussed above with respect to the angle modulator 150, the data is encoded on the frequency as opposed to the amplitude. Next, the second discriminator 164 converts frequency variations in the output of the limiter 162 into voltage variations to obtain the data.

The advantages and restrictions discussed above with respect to the demodulator of FIG. 5 equally apply to this demodulator embodiment.

Next, the operation of the modulator illustrated in FIG. 8 will be described. Since, as discussed above, the modulator of FIG. 8 only differs from the modulator of FIG. 3 in that the angle modulator 200 has replaced the angle modulator 100, only the operation of the angle modulator 200 will be described.

As discussed above, the angle modulator 200 is a combination of the angle modulator 100 and the angle modulator 150, and encodes first and second data on the communication signal. The first and second data can be different data or the same data.

The voltage controlled oscillator 152 inputs the first data for encoding on the communication signal, and generates a modulating signal having a constant amplitude and a varying frequency. The voltage controlled oscillator 152 varies the frequency of the modulating signal based on the first data. The adder 204 adds the second data and the constant CONST. The multiplier 202 multiplies the first modulating signal produced by the voltage controlled oscillator and the output of the adder 204 to produce a second modulating signal. The signal generator 106 generates the carrier signal having a constant amplitude and frequency $f_{cen}$, and angle modulates the carrier signal according to the second modulating signal.

The advantages and restrictions discussed above with respect to the modulator of FIG. 3 equally apply to this modulator embodiment.

Next, the operation of the demodulator illustrated in FIG. 9 will be described. As discussed above the demodulator of FIG. 9 only differs from the demodulator of FIG. 5 in that the angle demodulator 210 has replaced the angle demodulator 130. The angle demodulator 210, however, is a combination of the angle demodulator 130 and the angle demodulator 160. Since the operation of the angle demodulators 130 and 160 has been described in detail above, to describe the operation of angle demodulator 210 would merely be repetitive. Therefore, for a description of the operation of the angle demodulator 210, refer to the above descriptions of the angle demodulators 130 and 160.

The advantages and restrictions discussed above with respect to the demodulator of FIG. 5 equally apply to this demodulator embodiment.

Next, the operation of the demodulator illustrated in FIG. 10 will be described. As discussed above, the demodulator of FIG. 10 illustrates one possible application of the demodulator illustrated in FIGS. 5, 7 and 9, and only differs from the demodulator of FIGS. 5, 7 and 9 in that the switch 220 has been added. The switch 220 receives the angle modulated communication signal from the time delay circuit 132 and selectively outputs the angle modulated communication signal based on the data output by the angle demodulator 130, 160, 210. The data encoded on the angle modulated communication signal could, for instance, be a squelch control signal. Thus, the squelch control signal output by the angle demodulator 130, 160 or 210 would instruct the switch 220 when and when not to output the angle modulated communication signal. FIG. 10 also illustrates by a dashed line the other data output when the angle demodulator 210 is used.

Next, the operation of the modulator illustrated in FIG. 11 will be described. As discussed above, the modulator of FIG. 11 is substantially the same as the modulator embodiments illustrated in FIGS. 3, 6, and 8 with the addition of the compressor 22, the control tone generator 24 and the multiplier 224 replacing the multiplier 108. Therefore, only the operation of these elements will be discussed in detail.

The compressor 22 inputs and compresses the communication signal based on the envelope of the communication signal output by the control tone generator 24. Since the operation of the compressor 22 and the control tone generator 24 were discussed in detail previously, the operation thereof will not be repeated. The angle modulator 100, 150, 200 receives the control tone as the data and generates the angle modulated carrier signal based on the control tone. Only one or both of the data inputs of the angle modulator 200 may be supplied with the control tone. The multiplier 224 multiplies the compressed communication signal and the angle modulated carrier signal to produce an angle modulated compressed communication signal.

In this manner, the control tone is encoded on the compressed communication signal. As such, the bandwidth of the signal transmitted by the transmitter 36 is significantly reduced since the control tone no longer is transmitted at a non-overlapping frequency band as shown in FIG. 2.

The other advantages and restrictions discussed above with respect to the modulator of FIG. 3 equally apply to this modulator embodiment.

Next, the operation of the demodulator illustrated in FIG. 12 will be described. As discussed above, the modulator of FIG. 12 is substantially the same as the modulator embodiments illustrated in FIGS. 5, 7, and 9 with the addition of the expander 42 and the post demodulator processor 222. Therefore, only the operation of these elements will be discussed in detail.

The post demodulator processor 222 performs the reverse of the operation performed by the control tone generator 24 on the envelope of the communication signal to generate the control tone. Thus, with respect to the corresponding modulator of FIG. 11, the post demodulator processor 222 performs the reverse operation of logarithmic amplifier 28. Therefore, in this embodiment, the post demodulator processor 222 is the same as anti-logarithm circuit 50. The post demodulator processor 222 receives the control tone output by the angle demodulator 130, 160, and 210, and outputs the envelope of the communication signal. The expander 42, as described in detail previously, expands the angle modulated compressed communication signal according to the envelope signal. The dashed line in FIG. 12 represents the other data output when the angle demodulator 210 is used.

In this manner, the angle modulated compressed communication signal is expanded without having to receive the control tone at a separate non-overlapping frequency band. The other advantages and restrictions discussed above with respect to the demodulator of FIG. 5 equally apply to this demodulator embodiment.

Historically, Lincompex technology has been used to enhance analog amplitude modulated (AM) signals such as HFSSB. U.S. Pat. No. 5,058,202 teaches that Lincompex technology can be used to enhance frequency modulated (FM) signals and U.S. Pat. No. 4,907,217 teaches that Lincompex can be used to enhance parallel-tone or multi-tone digital data signals.

Studies have shown that Lincompex technology can be used to enhance most communication signals if the control tone is passed by the modulation technique used, whether analog or digital. This restriction has made Lincompex technology technically unfeasible to use with a number of digital modulation techniques because the control tone is not passed or is distorted, thereby destroying the envelope information.

This invention disclosed in the present application has eliminated the traditional separate Lincompex control tone, and instead, uses angle modulation to convey envelope information. That is, the compression on the transmit end is linked to the expansion on the receive end by envelope data conveyed by modulating the angle of the base band signal.

This breakthrough allows Lincompex technology to be technically feasible to enhance all communication signals, particularly digital signals which in the past, distorted the control tone. Therefore, applications now include digital signals such as those used in cellular telephones which are: π/4 shifted differentially encoded quadrature phase shift keying (π/4 DQPSK), Gaussian minimum shift keying (GMSK), BPSK; and Personal Communications Systems (PCS) which use Gaussian frequency shift keying (GFSK).

In fact, the range of analog and digital applications now include, but are not limited to, the following: AM, FM, PM, PCM, ASK, QPSK, π/4 DQPSK, Binary Phase Shift Keying (BPSK), OQPSK, MSK, FSK, CPFSK, MFSK, GMSK, GFSK, and CVSD.

Next, the operation of the modulator illustrated in FIG. 13 will be described. As discussed above, the modulator of FIG. 13 is substantially the same as the modulator embodiments illustrated in FIGS. 3, 6, and 8 with the addition of the compressor 22, the control tone generator 24, the summer 32 and the multiplier 224 replacing the multiplier 108. Therefore, only the operation of these elements will be discussed in detail.

The compressor 22 inputs and compresses the communication signal based on the envelope of the communication signal output by the control tone generator 24. Since the operation of the compressor 22, the control tone generator 24, and the summer 32 were discussed in detail previously, the operation thereof will not be repeated.

The angle modulator 100, 150, 200 inputs the data to encode on the communication signal and generates the angle modulated carrier signal based on the data. The multiplier 224 multiplies the sum of the compressed communication signal and the control tone by the angle modulated carrier signal to produce an angle modulated compressed communication signal plus the control tone. FIG. 13 illustrates by a dashed line that another set of data can be encoded on the compressed communication signal when angle modulator 200 is used.

The advantages and restrictions discussed above with respect to the modulator of FIG. 3 equally apply to this modulator embodiment.

Next, the operation of the demodulator illustrated in FIG. 14 will be described. As discussed above, the modulator of FIG. 14 is substantially the same as the modulator embodiments illustrated in FIGS. 5, 7, and 9 with the addition of the low-pass filter 40, the fading regulator 58, the expander 42, the band-pass filter 46, the frequency discriminator 48, and the anti-logarithm circuit 50. The operation of the low-pass filter 40, the fading regulator 58, the expander 42, the band-pass filter 46, the frequency discriminator 48, and the anti-logarithm circuit 50 were discussed in detail previously, and therefore, will not be repeated. Additionally, the operation of the angle demodulator 130, 160, 210 was also discussed above in detail. The dashed line in FIG. 14 represents the other data output when the angle demodulator 210 is used.

The advantages and restrictions discussed above with respect to the demodulator of FIG. 5 equally apply to this demodulator embodiment.

Another variation to the embodiments illustrated in FIGS. 11–14 of the present invention applies to an autobypass operation. As described in the '499 patent, the autobypass operation is where the Lincompex expander switches out of Lincompex demodulation due to a low signal-to-noise ratio with respect to the control tone. When the signal-to-noise ratio of the control tone is below a certain level, the Lincompex expander determines, for example, that a non-Lincompex signal (standard transmission) has been received. Accordingly, the received signal is not Lincompex expanded by the Lincompex expander.

Another variation to the embodiments illustrated in FIGS. 11–14 of the present invention applies to an autosilence operation as disclosed in U.S. Pat. No. 4,944,024 (the "'024 patent") issued Jul. 24, 1990, to Leveque, the Inventor of the present application. The '024 application is hereby incorporated by reference. As described in the '024 patent, the effect of random noise fluctuation in the Lincompex expander is reduced by injecting a small amount of artificial tone into the Lincompex expander circuitry to produce quieting of the system. The frequency of the artificial tone is such that the Lincompex expander will bias the noise toward a constant quiet level when no meaningful communication signals are being transmitted. The effective level of this artificial tone should be sufficiently small so that at Lincompex transmission and above, (signal at which Lincompex demodulation is acceptable) there is no significant detrimental effect on the recovered signal. The level, however, should be large enough so that below the Lincompex transmission threshold, the biasing effect is produced so that the Lincompex expander self quiets.

While the above embodiments have been described with respect to the transmission of analog audio signals, digital audio signals can be transmitted and received using the Lincompex compressor and expander illustrated and described in the '217 patent.

Furthermore, other compression techniques, such as linear compression, may be used, and the information regarding the compression encoded on the communication signal as data through angle modulation. This provides for a much more flexible demodulator, since the demodulator can decompress any angle modulated compressed communication signal without having prior knowledge of the compression process.

Also, instead of the hardware implementations described above, each embodiment could be implemented through a digital signal processor (software) or other means.

The invention being thus described, it will be obvious that the same may be varied in many ways. Such variations are not to be regarded as departure from the spirit of scope of the invention, and all such modifications would be obvious to one skilled in the art are intended to be included within the scope of the following claims:

I claim:

1. A method of transmitting a communication signal having information encoded thereon by modulating the angle of said communication signal comprising:
   (a) inputting a complex waveform;
   (b) developing an envelope signal representative of said complex waveform;
   (c) compressing said complex waveform in proportion to a level of said envelope signal to develop a compressed signal having a predetermined frequency band;
   (d) developing a control tone from said envelope signal;
   (e) angle modulating said control tone producing an information signal;
   (f) multiplying and thereby modulating said compressed signal by said information signal to produce a communication signal; and
   (g) transmitting said communication signal across a transmission medium.

2. The method of claim 1, further comprising:
   (h) receiving said communication signal from said transmission medium;
   (i) demodulating said communication signal to produce said compressed signal and said information signal;
   (j) angle demodulating said information signal to produce said control tone; and
   (k) demodulating said compressed signal according to Lincompex techniques using said control tone to recover said complex waveform.

3. The method of claim 1, wherein said complex waveform is a parallel-tone or multi-tone digital data signal.

4. The method of claim 1, wherein said complex waveform comprises an audio signal.

5. The method of claim 4, wherein said audio signal comprises a voice signal.

6. The method of claim 1, wherein said step (g) transmits said communication signal using a wireless transmitting technique.

7. The method of claim 6, wherein said transmitting technique is one of SSB, AM, FM, PM, PCM, ASK, QPSK, π/4 DQPSK, BPSK, OQPSK, MSK, FSK, CPFSK, MFSK, GMSK, GFSK, and CVSD.

8. The method of claim 1, wherein said angle modulation comprises phase modulating.

9. The method of claim 2, wherein said angle demodulation comprises phase demodulation.

10. A method of transmitting a communication signal having information encoded thereon by modulating the angle of said communication signal comprising:
    (a) inputting a complex waveform;
    (b) developing an envelope signal representative of said complex waveform;
    (c) compressing said complex waveform in proportion to a level of said envelope signal to develop a compressed signal having a predetermined frequency band;
    (d) developing a control tone from said envelope signal;
    (e) summing said compressed signal and said control tone to produce a combination signal;
    (f) inputting a data signal;
    (g) angle modulating said data signal producing an information signal;
    (h) multiplying and thereby modulating said combination signal by said information signal producing a communication signal; and
    (i) transmitting said communication signal across a transmission medium.

11. The method of claim 10, further comprising:
    (j) receiving said communication signal from said transmission medium;
    (k) demodulating said communication signal to recover said combination signal and said information signal;
    (l) angle demodulating said information signal to recover said data signal;
    (m) demodulating said combination signal to recover said control tone and compressed signal; and
    (n) demodulating said compressed signal according to Lincompex techniques using said control tone to recover said complex waveform.

12. The method of claim 10, wherein said complex waveform is a parallel-tone or multi-tone digital data signal.

13. The method of claim 10, wherein said complex waveform is an audio signal.

14. The method of claim 13, wherein said audio signal is a speech signal.

15. The method of claim 10, wherein said step (i) transmits said communication signal using a wireless transmitting technique.

16. The method of claim 15 wherein said transmitting technique is one of SSB, AM, FM, PM, PCM, ASK, QPSK, π/4 DQPSK, BPSK, OQPSK, MSK, FSK, CPFSK, MFSK, GMSK, GFSK, and CVSD.

17. The method of claim 10, wherein said angle modulation comprises phase modulation.

18. The method of claim 11, wherein said angle demodulation comprises phase demodulation.

19. An apparatus for transmitting a communication signal having information encoded thereon by modulating the angle of said signal, comprising:
    means for inputting a complex waveform;
    means for developing an envelope signal representative of the envelope of said complex waveform;
    means for compressing said complex waveform in proportion to a level of said envelope signal to develop a compressed signal having a predetermined frequency band;
    means for developing a control tone from said envelope signal;
    means for angle modulating said control tone producing an information signal;
    means for multiplying, and thereby modulating, said compressed signal by said information signal to produce said communication signal; and means for transmitting said communication signal across a transmission medium.

20. The apparatus of claim 19, further comprising:
means for receiving said communication signal from said transmission medium;
means for demodulating said communication signal to produce said compressed signal and said information signal;
means for angle demodulating said information signal to produce said control tone; and
means for demodulating said compressed signal according to Lincompex techniques using said control tone to recover said complex waveform.

21. The apparatus of claim 19, wherein said complex waveform is a parallel-tone or multi-tone digital data signal.

22. The apparatus of claim 19, wherein said complex waveform comprises an audio signal.

23. The apparatus of claim 22, wherein said audio signal is a voice signal.

24. The apparatus of claim 19, wherein said means for transmitting said communication signal is a wireless transmitting means.

25. The apparatus of claim 24, wherein said transmitting means is one of SSB, AM, FM, PM, PCM, ASK, QPSK, π/4 DQPSK, BPSK, OQPSK, MSK, FSK, CPFSK, MFSK, GMSK, GFSK, and CVSD.

26. The apparatus of claim 19, wherein said angle modulating means comprises phase modulating means.

27. The apparatus of claim 20, wherein said means for angle demodulating said information signal comprises phase demodulating means.

28. An apparatus for transmitting a communications signal having information encoded thereon by modulating an angle of said signal, comprising:
means for inputting a complex waveform;
means for developing an envelope signal of said complex waveform;
means for compressing said complex waveform in proportion to said envelope signal to develop a compressed signal having a predetermined frequency band;
means for developing a control tone from said envelope signal;
means for summing said compressed signal and said control tone producing a combination signal;
means for inputting a data signal;
means for angle modulating said data signal producing an information signal;
means for multiplying, and thereby modulating, said combination signal by said information signal to produce said communication signal; and
means for transmitting said communication signal across a transmission medium.

29. The apparatus of claim 28, further comprising:
means for receiving said communication signal from said transmission medium;
means for demodulating said communication signal to recover said combination signal and said information signal;
means for angle demodulating said information signal to recover said data signal;
means for demodulating said combination signal to recover said control tone and compressed signal; and
means for demodulating said compressed signal according to Lincompex techniques using said control tone to produce said complex waveform.

30. The apparatus of claim 28, wherein said complex waveform is a parallel-tone or multi-tone digital data signal.

31. The apparatus of claim 28, wherein said complex waveform is an audio signal.

32. The apparatus of claim 31, wherein said audio signal is a speech signal.

33. The apparatus of claim 28, wherein said means for transmitting said communication signal is a wireless transmitting means.

34. The apparatus of claim 33 wherein said transmitting means is one of SSB, AM, FM, PM, PCM, ASK, QPSK, π/4 DQPSK, BPSK, OQPSK, MSK, FSK, CPFSK, MFSK, GMSK, GFSK, and CVSD.

35. The apparatus of claim 28, wherein said angle modulating means comprises phase modulating means.

36. The apparatus of claim 29, therein said angle demodulating means comprises phase demodulating means.

37. A method for receiving and recovering an angle modulated communication signal having a control tone encoded thereon using angle modulation wherein Lincompex techniques are applied to a communication signal to produce a compressed communication signal and a control tone, said control tone being encoded on said compressed communication signal using angle modulation to produce an angle modulated compressed communication signal;
(a) receiving said angle modulated compressed communication signal from a transmission medium;
(b) angle demodulating said angle modulated compressed communication signal to recover said control tone and said compressed communication signal; and
(c) demodulating said compressed communication signal according to Lincompex techniques using said control tone to recover said communication signal.

38. The method of claim 37 wherein
step (b) includes,
(1) demodulating said angle modulated compressed communication signal to obtain a modulating signal; and
(2) determining said control tone from an envelope of said modulating signal; wherein,
step (c) includes demodulating said compressed communication signal according to Lincompex techniques using said control tone to recover said communication signal.

39. The method of claim 38, wherein step (1) converts frequency variations of said angle modulated compressed communication signal into voltage variations to obtain said modulating signal.

40. The method of claim 37, wherein
step (b) includes,
(1) demodulating said angle modulated compressed communication signal to obtain a modulating signal; and
(2) demodulating said modulating signal to obtain said control tone; and wherein
step (c) includes demodulating said compressed communication signal according to Lincompex techniques using said control tone to recover said communication signal.

41. The method of claim 40, wherein step (2) converts frequency variations of said modulating signal into voltage variations to obtain said control tone.

42. The method of claim 37, wherein in addition to said control tone, data is encoded on said angle modulated compressed communication signal using angle modulation, and step (b) includes,
- (1) demodulating said angle modulated compressed communication signal to obtain a modulating signal;
- (2) determining said control tone from an envelope of said modulating signal; and
- (3) demodulating said modulating signal to obtain said data; and wherein, step (c) includes demodulating said compressed communication signal according to Lincompex techniques using said control tone to recover said communication signal.

43. The method of claim 37, wherein in addition to said control tone, data is encoded on said angle modulated compressed communication signal using angle modulation, and, step (b) includes,
- (1) demodulating said angle modulated compressed communication signal to obtain a modulating signal;
- (2) determining said data from an envelope of said modulating signal;
- (3) demodulating said modulating signal to obtain said control tone; and wherein, step (c) includes demodulating said compressed communication signal according to Lincompex techniques using said control tone to recover said communication signal.

44. An apparatus for receiving an angle modulated compressed communication signal having a control tone encoded thereon using angle modulation wherein Lincompex techniques are applied to a communication signal to produce a compressed communication signal and a control tone, and said control tone is encoded on said compressed communication signal using angle modulation to produce said angle modulated compressed communication signal, comprising:

- a means for receiving said angle modulated compressed communication signal from a transmission medium
- an angle demodulator means for angle demodulating said angle modulated compressed communication signal to recover said control tone and said compressed communications signal; and
- a means for demodulating said compressed communication signal according to Lincompex techniques using said control tone to recover said communication signal.

45. The apparatus of claim 44, wherein said angle demodulator means includes,
- a demodulating means for demodulating said angle modulated compressed communication signal to obtain a modulating signal; and
- means for determining said control tone from an envelope of said modulating signal; whereby said compressed communication signal is demodulated according to Lincompex techniques using said control tone to recover said communication signal.

46. The apparatus of claim 45, wherein said demodulating means converts frequency variations of said angle modulated compressed communication signal into voltage variations to obtain said modulating signal.

47. The apparatus of claim 44, wherein said angle demodulator means includes,
- a first demodulating means for demodulating said angle modulated compressed communication signal to obtain a modulating signal; and
- a second demodulating means for demodulating said modulating signal to obtain said control tone; whereby said means for demodulating said compressed communication signal demodulates said signal according to Lincompex techniques using said control tone obtained by said second demodulating means to recover said communication signal.

48. The apparatus of claim 47, wherein said second demodulating means converts frequency variations of said modulating signal into voltage variations to obtain said control tone.

49. The apparatus of claim 44, wherein in addition to said control tone, data is encoded on said angle modulated compressed communication signal using angle modulating, wherein said angle demodulator means includes,
- a first demodulating means for demodulating said angle modulated compressed communication signal to obtain a modulating signal;
- a means for determining said control tone from an envelope of said modulating signal; and
- a second demodulating means for demodulating said modulating signal to obtain said data; whereby said compressed communication signal is demodulated according to Lincompex techniques using said control tone to recover said communication signal.

50. The apparatus of claim 44, wherein in addition to said control tone, data is encoded on said angle modulated compressed communication signal using angle modulation, wherein said angle demodulator means includes,
- a first demodulating means for demodulating said angle modulated compressed communication signal to obtain a modulating signal;
- a means for determining said data from an envelope of said modulating signal; and
- a second demodulating means for demodulating said modulating signal to obtain said control tone; whereby said compressed communication signal is demodulated according to Lincompex techniques using said control tone to recover said communication signal.

* * * * *